Nov. 12, 1968  H. H. DRONBERGER  3,410,247
CONTROL KNOB ASSEMBLY
Filed March 30, 1965

INVENTOR
Hal H. Dronberger
BY Edward C. Arey
ATTORNEY

United States Patent Office 3,410,247
Patented Nov. 12, 1968

3,410,247
CONTROL KNOB ASSEMBLY
Hal H. Dronberger, Columbus, Ohio, assignor to Westinghouse Electric Corporation, Pittsburgh, Pa., a corporation of Pennsylvania
Filed Mar. 30, 1965, Ser. No. 443,811
3 Claims. (Cl. 116—133)

ABSTRACT OF THE DISCLOSURE

A control knob assembly in which a base having a forwardly facing seat is mounted on a control spindle in a particular angular disposition, and an indicator ring is mounted on the seat, the seat having openings and the ring having prongs which engage with each other and are arrayed in mirror image relation with each other, at least one of the openings and prongs being irregularly spaced with respect to the others so that the ring may be seated in a single angular position only relative to the base, the single angular position being that which correlates the indicia on the indicator ring with the respective rotative positions of the control spindle.

---

This invention relates to improvements in control knob assemblies of the type commonly used on appliances and the like.

Standardization and interchangeability of parts are, to say the least, well recognized cost reduction techniques. Opposing standardization in most consumer oriented markets, such as the major appliance markets, is the increasing demand for additional features, more sophisticated operating cycles if applicable, varying combinations respecting appearance of products, and expanded numbers of models. Accordingly the provision of any part in an arrangement which tends to resolve the conflict between the opposing requirements constitutes a worthy effort indeed.

The object of this invention is the provision of a control knob assembly which lends itself to standardization, but also has the quality of flexibility in use with respect to its application on various devices.

In accordance with the invention the control knob assembly comprises two separate, principal parts; a base adapted to be mounted upon a control spindle in a single selected position only, and an indicator portion provided with indicia correlated with the various rotative positions of the control spindle, and including means for mounting it upon the base in a single selected position only. Thus, a standard base may be used upon different models of a device having different operating cycles, with only the indicator portion, provided with the proper indicia corresponding to a particular operating cycle, differing between models. Of course, the indicator portion may not only have different indicia for different models having different operating cycles, but additionally, colors may be varied to suit the consumer's taste, and even foreign languages may be used where the market is appropriate.

The invention will be described in connection with the accompanying drawing illustrating a currently preferred control knob assembly incorporating the invention by way of example, and wherein.

While the control knob selected as an example for purposes of the description has an indicator portion of the type which fits it for use in domestic dishwashers, it will be appreciated that the inventive arrangement is not restricted to such application.

Figure 1:
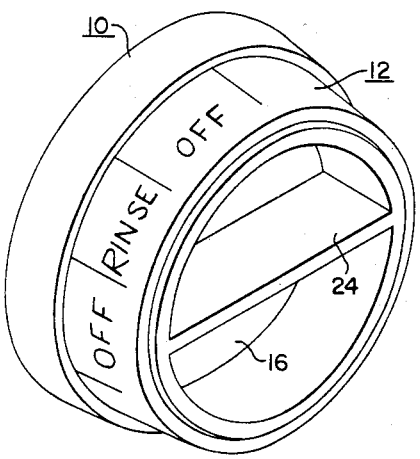
FIGURE 1 is an isometric view of the control knob assembly.
Figure 2:
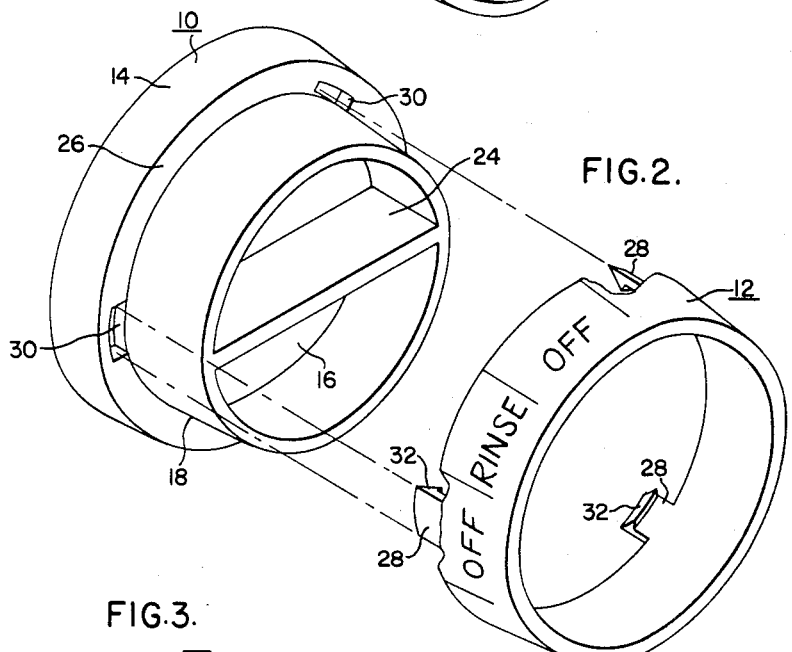
FIG. 2 is an exploded isometric view illustrating the base portion and indicator portion separated from each other.
Figure 3:
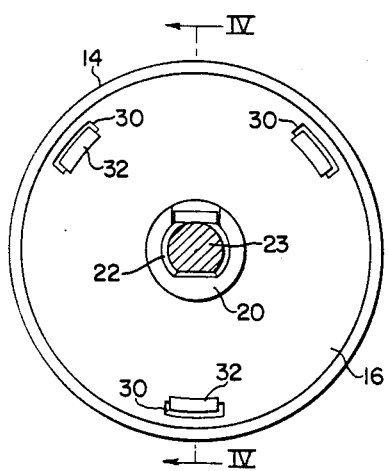
FIG. 3 is a rear elevation of the knob assembly.
Figure 4:
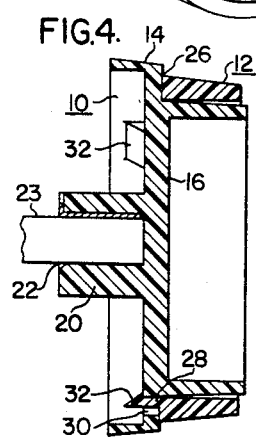
FIG. 4 is a sectional view corresponding to one taken along the line IV—IV of FIG. 3.

The control knob includes the base portion 10 and separate indicator portion 12 shown in assembled relation in FIG. 1 and exploded relation in FIG. 2. The base portion 10 is preferably a one-piece, relatively hard plastic part, although it could be alternatively be a cast metal part, formed to include: a rearwardly-open, cap-shaped member comprising an outer flange 14 projecting rearwardly from the periphery of a transverse wall 16; and a forwardly-open, diametrically-smaller, cylindrical sleeve 18 projecting forwardly from the front face of the transverse wall 16. The rear face of the wall 16 has a rearwardly-projecting control shank 20 provided with a non-circular bore 22 (FIG. 3) to receive the end of a control device spindle 23 (FIG. 4). A cross bar 24 extends diametrically across the hollow inside of the forwardly-projecting sleeve 18 to serve as one type of convenient thumb and finger grip for the user to rotate the control knob when desired.

The seat for the separate indicator ring 12 is formed by the circumferentially surface of the sleeve 18, and the forwardly-facing outer marginal shoulder 26 of the transverse wall 16.

The indicator ring 12 has suitable indicia presented on its circumferential face to correspond with the contemplated control cycle of the device with which the knob will be used.

In an alternative arrangement, the ring may be transparent and a ribbon of paper or a similar thin material carrying the indicia can be held between the ring and the sleeve 18. The inner diameter of the ring is slightly greater than the outer diameter of the sleeve 18 so that the ring may be easily assembled to the base, but seats firmly. The outer surface of the ring may be provided with a taper as shown.

Figure 5:
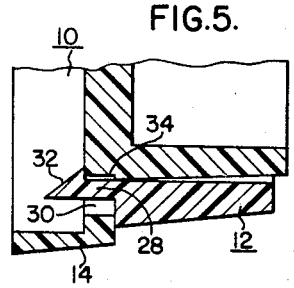
FIG. 5 is a fragmentary sectional view, similar to but enlarged with respect to FIG. 4, highlighting the connecting arrangement between the indicator and base portions of the knob.

The means for securing the indicator ring 12 to the base 10 in a manner preventing relative rotation therebetween comprises rearwardly-projecting tabs or prongs 28 on the rear edge of the ring disposed to project through, and engage the means defining, the slots 30 provided adjacent the inner periphery of the shoulder 26 of the base. The prongs are formed as an integral part of the ring. The ring material is also preferably a hard plastic, selected to permit limited flexure of the relatively thin prongs 28 when the ring is snapped into assembled position on the base. As shown in FIGS. 4 and 5, the free end of each prong has a cross ridge 32 on its inner face for engagement with the rear face of the transverse wall 16 when the ring is pressed into place upon the base 10. Promiscuous removal of the ring from the base 10, without the use of a thin edge tool, is practically precluded unless the base is first removed from the control spindle 23. Even then the prongs 28 must be forced radially outwardly a sufficient amount that the ridges 32 clear the rear face of transverse wall 16. As further insurance against the loss of a ring from a base, an additional offset 34 may be provided adjacent the forward edge of the slot 30, as best shown in FIG. 5.

To prevent assembly of the ring upon the base with the ring indicia out of correspondence with the operating cycle of the device, at least one of the prongs 28 (and conformably one of the slots 30) is irregularly spaced in a circumferential direction from the others. For example, as shown in FIG. 3, the angular distribution between the three prongs is 130 degrees, 100 degrees, and 130 degrees, and the slots are accordingly spaced. Thus the ring will fit the base in fully seated, snapped-on relation in the single pre-selected position only.

While in the example three prongs and three slots are shown, it will be appreciated that in certain instances two prongs, non-regularly spaced, may be adequate, whereas in other instances it may be desirable to have more than three prongs.

It will be appreciated in the light of the foregoing description that not only must the positioning of the prongs with respect to the indicia on the ring be correlated, but the position of the slots on the base portion must also be correlated with the non-regular inner surface of the bore 22 which receives the conforming non-regular outer surface of the control spindle 23.

I claim as my invention:

1. A control knob assembly adapted to be attached to a control spindle, comprising:

a knob base having an integral concentric hub of reduced diameter extending from one side of said base and forming an annular seat about said base, an integral concentric keyed hub member of reduced diameter extending from the opposite side of said base, a separate angular position indicator control member adapted to be concentrically positioned about said hub against said annular seat said keyed hub member mounting said base on said control spindle in a single angular position;

a plurality of engaging means in a circular array formed as a part of said base at said annular seat, an equal plurality of base engaging means of complementary shape relative to said engaging means formed as a part of said control member, said base engaging means being arrayed in mirror image relation with said engaging means to mate therewith, at least a portion of said engaging means and said base engaging means including means to interlock said indicator control member to said base member in non-rotative and non-disengaging relation;

the spacing between successive ones of both said engaging means and said base engaging means being different to prevent assembly of said indicator control member on said base in any angular position other than a single angular position, said single angular position being preselected to correlate said indicia to the respective rotative control position of said control spindle.

2. A control knob according to claim 1, wherein:

said engaging means comprises openings in said seat; and said base engaging means extend axially from said control member.

3. A control knob according to claim 1, wherein:

said first mentioned integral concentric hub comprises a forwardly-open sleeve; and said assembly includes a diametrically-extending actuator bar in said sleeve.

References Cited

UNITED STATES PATENTS

| | | |
|---|---|---|
| 960,946 | 6/1910 | Jones. |
| 1,039,354 | 9/1912 | Bonadio _____ 285—319 XR |
| 1,226,161 | 5/1917 | Anthony _____ 339—91 |
| 1,563,351 | 12/1925 | Field et al. |
| 1,899,360 | 2/1933 | Roudbush et al. _____ 339—91 |
| 2,103,743 | 12/1937 | Doty _____ 29—453 XR |
| 2,136,160 | 11/1938 | Tinnerman _____ 287—53 |
| 2,667,084 | 1/1954 | MacNamara _____ 74—504 |
| 2,706,774 | 4/1955 | Bowman _____ 74—553 XR |
| 3,010,743 | 11/1961 | Bengtson _____ 74—553 XR |

LOUIS J. CAPOZI, *Primary Examiner.*